(12) United States Patent
Warner et al.

(10) Patent No.: US 8,446,282 B1
(45) Date of Patent: May 21, 2013

(54) ANIMAL TRACKING TRANSMITTER ANCHOR ASSEMBLY INCLUDING A BREAKABLE ARM

(76) Inventors: John Warner, Yankton, SD (US); Brandon Bruder, Yankton, SD (US)

(*) Notice: Subject to any disclaimer, the term of this patent is extended or adjusted under 35 U.S.C. 154(b) by 867 days.

(21) Appl. No.: 12/498,011

(22) Filed: Jul. 6, 2009

(51) Int. Cl.
*G08B 21/00* (2006.01)

(52) U.S. Cl.
USPC .............. 340/573.1; 340/573.2; 473/578

(58) Field of Classification Search
USPC ............ 340/573.1, 573.2; 473/577, 578, 473/586
See application file for complete search history.

(56) References Cited

U.S. PATENT DOCUMENTS

| | | |
|---|---|---|
| 4,704,612 A | 11/1987 | Boy et al. |
| RE33,470 E | 12/1990 | Boy et al. |
| 4,976,442 A | 12/1990 | Treadway |
| 6,409,617 B1 | 6/2002 | Armold |
| 2003/0176245 A1 | 9/2003 | Cyr et al. |
| 2006/0089216 A1* | 4/2006 | Monteleone .............. 473/578 |
| 2007/0142137 A1 | 6/2007 | Davenhaver |

* cited by examiner

*Primary Examiner* — Jeffery Hofsass

(57) ABSTRACT

An animal tracking transmitter anchor assembly includes a mount that is positionable on an arrow. An arm is attached to and extends away from the mount. A casing is mounted to the arm and a hook is attached to the casing. The hook has a point that is directed toward the mount and is embeddable into an animal when the arrowhead goes into the animal. The hook halts the penetration of the casing when an arrowhead of the arrow enters the animal. The stopping of the casing breaks the arm to allow the arrowhead to further penetrate the animal. A transmitter is mounted in the casing and remains with the animal. The transmitter emits a wireless signal detectable by a receiver to determine a direction of the transmitter by the receiver.

7 Claims, 4 Drawing Sheets

ANIMAL TRACKING TRANSMITTER ANCHOR ASSEMBLY INCLUDING A BREAKABLE ARM

BACKGROUND OF THE DISCLOSURE

Field of the Disclosure

The disclosure relates to game animal tracking transmitter anchor devices and more particularly pertains to a new game animal tracking transmitter anchor device for embedding a tracking device in the hide of an animal as it is struck by an arrow to allow for easier tracking of the animal.

SUMMARY OF THE DISCLOSURE

An embodiment of the disclosure meets the needs presented above by generally comprising a mount that is positionable on an arrow. An arm is attached to and extends away from the mount. A casing is mounted to the arm and a hook is attached to the casing. The hook has a point that is directed toward the mount and is embeddable into an animal when the arrowhead goes into the animal to halt the penetration of the casing when an arrowhead of the arrow enters the animal. The stopping of the casing breaks the arm to allow the arrowhead to further penetrate the animal. A transmitter is mounted in the casing. The transmitter emits a wireless signal detectable by a receiver to determine a direction of the transmitter by the receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
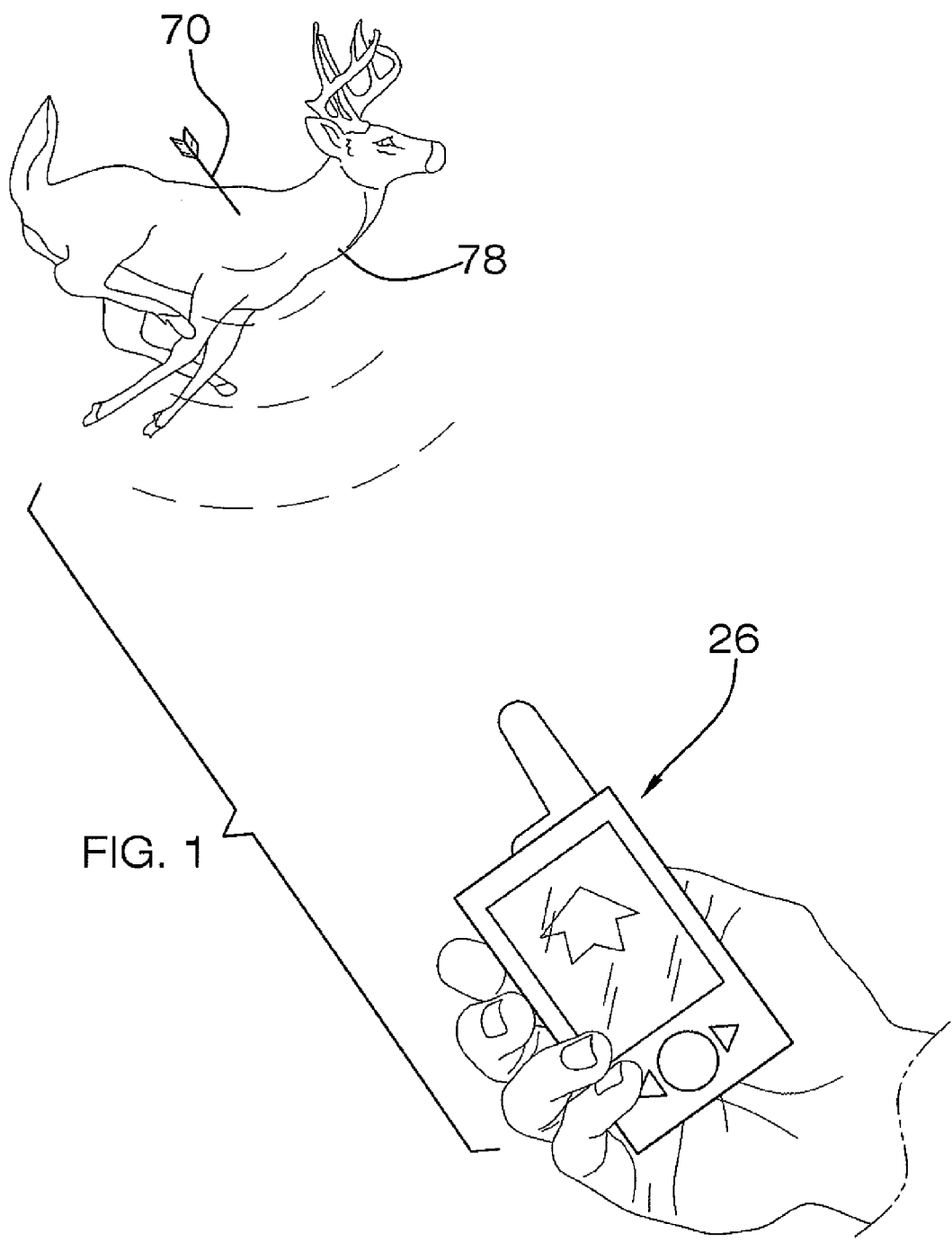
FIG. 1 is a front in-use view of an animal tracking transmitter anchor assembly according to an embodiment of the disclosure.
Figure 2:
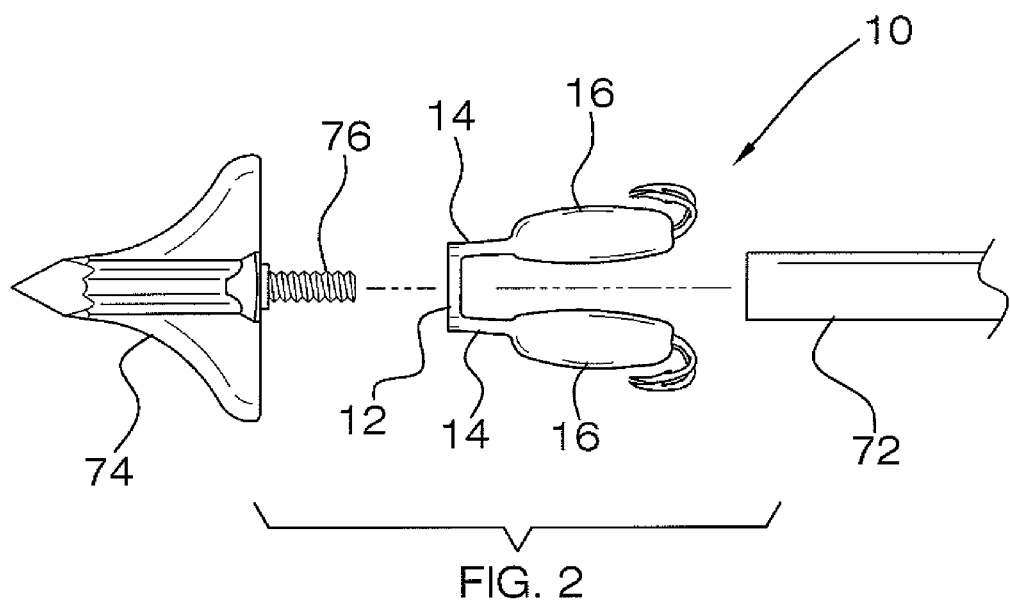
FIG. 2 is a side view of an embodiment of the disclosure.
Figure 3:
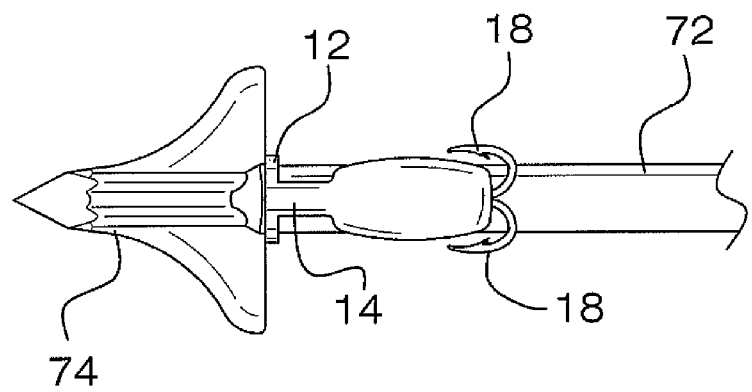
FIG. 3 is a side view of an embodiment of the disclosure.
Figure 4:
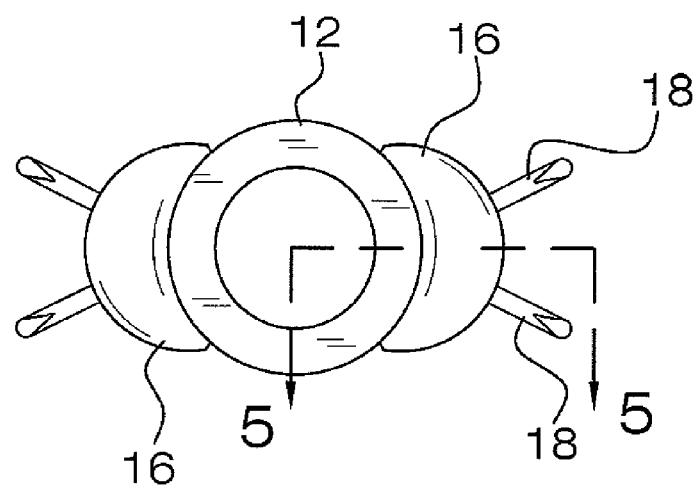
FIG. 4 is a front view of an embodiment of the disclosure.
Figure 5:
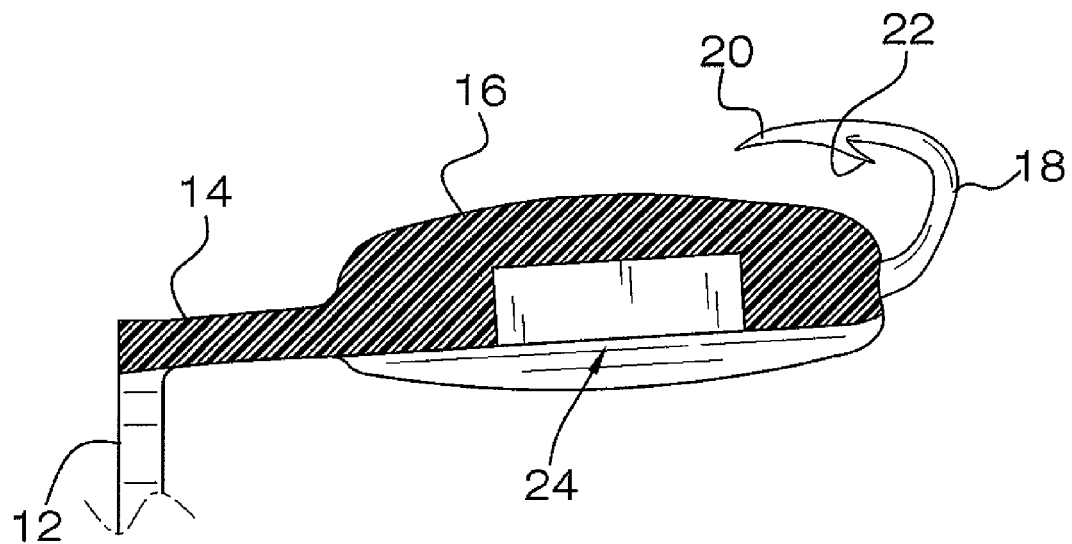
FIG. 5 is a cross-sectional view taken along line 5-5 of FIG. 4 of an embodiment of the disclosure.
Figure 6:
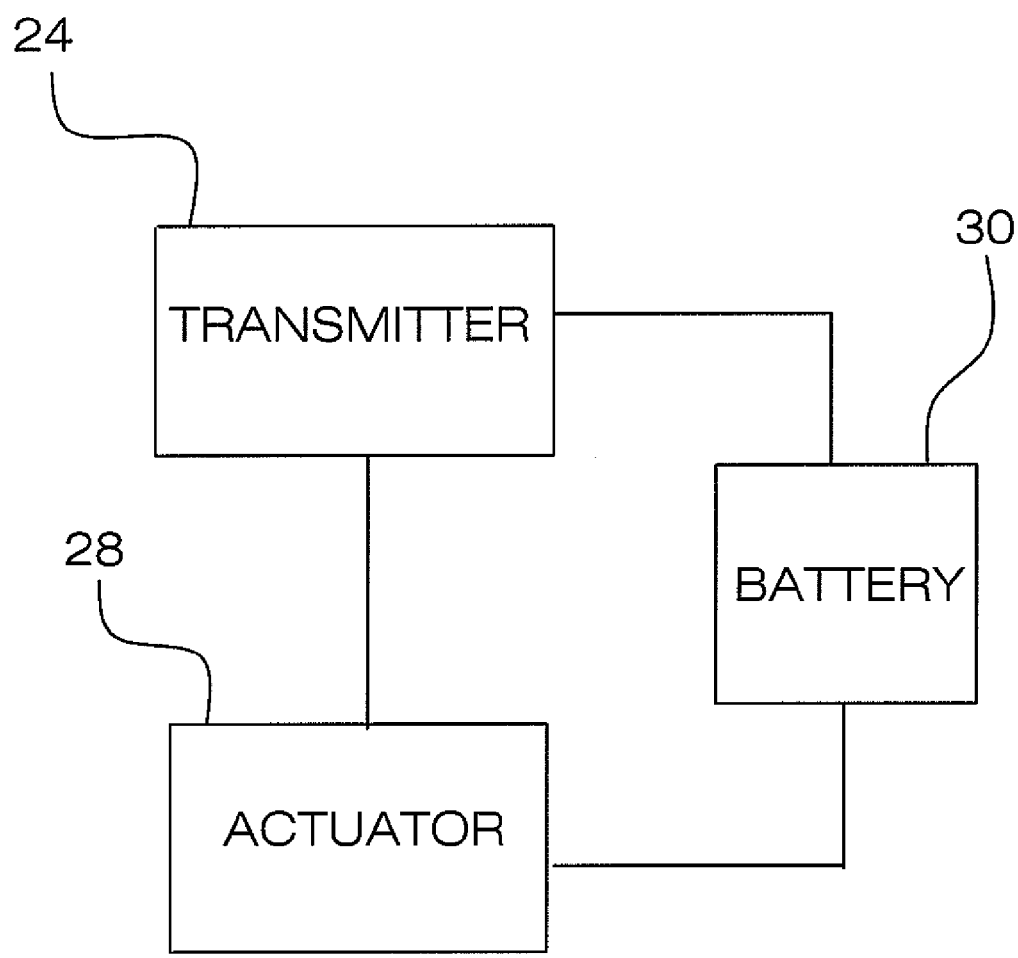
FIG. 6 is a schematic view of an embodiment of the disclosure.

With reference now to the drawings, and in particular to FIGS. 1 through 6 thereof, a new game animal tracking transmitter anchor device embodying the principles and concepts of an embodiment of the disclosure and generally designated by the reference numeral 10 will be described.

As best illustrated in FIGS. 1 through 6, the animal tracking transmitter anchor assembly 10 generally comprises a mount 12 that is positionable on an arrow 70. The arrow 70 is a conventional arrow 70 having an arrow shaft 72 and an arrowhead 74 which includes a threaded post 76. The threaded post 76 is threadably coupled to the arrow shaft 72 to secure the two together. The mount 12 comprises a closed loop, which may be circular, and the threaded post 76 of the arrowhead 74 is extendable through the closed loop to hold the mount 12 between the arrowhead 74 and the arrow shaft 72. For this reason, the mount 12 will typically have an outer diameter equal to within 1 cm of an outer diameter of the arrow shaft 72 but at least greater than 1 mm than outer diameter of the shaft 72.

A pair of arms 14 is attached to and extends away from the mount 12 in a same direction with respect to each other. The arms 14 are spaced from each other and are typically positioned directly opposite of each other. The arms 14 abut the outer surface of the mount 12 to allow the arrow shaft 72 to be positioned between the arms 14 as the arms 14 extend along the outer surface of the arrow shaft 72.

A pair of casings 16 is provided. Each of the arms 14 has one of the casings 16 attached thereto and is distal to the mount 12. The arms 14 may be made of a plastic material and are frangible to break when kinetic energy between the mount 12 and the casings 16 is greater than a selected foot pounds. The selected foot pounds may vary depending on the weight of the arrow 70 and the type of bow being used but may be at least 1 foot pound to avoid accidentally breaking arms 14. Since most arrows 70 are shot having kinetic energy greater than about 20 foot pounds, the selected foot pounds should generally not be greater than 20 foot pounds.

A pair of hooks 18 is provided. Each of the casings 16 has one of the hooks 18 fixedly attached thereto and as shown in the Figures each of the casings 16 may include two hooks 18. The hooks 18 each have a point 20, and may include a barb 22, that is directed toward the mount 12 and is embeddable into an animal 78 when the arrowhead 74 goes into the animal 78 to halt penetration of the casings 16 while the arrowhead 74 enters the animal 78. By stopping the penetration of the casings 16, the arms 14 are caused to break and the casings 16 are left attached to the animal 78. This is important as an arrow 70 often travels entirely through an animal 78.

A pair of transmitters 24 is provided. Each of the casings 16 has one of the transmitters 24 mounted therein. The transmitters 24 emit a wireless signal detectable by a receiver to determine a direction of the transmitters by the receiver 26. It should be understood that a single transmitter 24 may be used though the redundancy of utilizing two transmitters 24 may be preferred. The receiver 26 and transmitters 24 are generally conventional locating beacon type devices as might be used when searching for a lost child. However, the transmitter 24 may include an actuating assembly 28 for selectively turning on the transmitter 24 when it is needed. This may be accomplished in a plurality of manners. One such manner is to include a switch mounted on the transmitter or casing which is simply actuated before the arrow 12 is used. Another means of actuation may include an electrical connection between transmitter 24 and the mount 12 which turns the transmitter 24 on when the arms 14 are broken. Yet another means may include a tab attached to the mount 12 and extending between a power source 30 and the transmitter 24 so that the tab is pulled away to allow power to flow to the transmitter 24 when the arms 14 break.

In use, the arrow 70 is fitted with the mount 12 as described above and as shown in the Figures. If required, the transmitters 24 are turned on and the arrow 70 then shot at game.

When the arrow 70 strikes the game, the arrowhead 74 will bore into and likely through the animal 78. However, the hooks 18 will embed themselves into the hide of the animal 78 to stop the forward movement of the casings 16 to break the arms 14. This will then allow a person to use the receiver 26 to track the signal being emitted by the transmitters 24. The ability to effectively track the animal 78 with a small device which will not affect arrow 70 flight will reduce the likelihood of losing the animal 78 after it has been struck by the arrow 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A transmitter anchoring assembly being mountable on an arrow and being embeddable into an animal when the arrow strikes the animal to assist a person in tracking the animal, said assembly including:
    a mount being positionable on an arrow;
    an arm being attached to and extending away from said mount;
    a casing being mounted to said arm;
    a hook being attached to said casing, said hook having a point being positioned behind said mount, said point being directed forward toward said mount and being embeddable into the animal when the arrowhead goes into the animal to halt penetration of said casing when the arrowhead enters the animal and breaking said arm; and
    a transmitter, said casing having said transmitter mounted therein, said transmitter emitting a wireless signal detectable by a receiver to determine a direction of said transmitter by the receiver.

2. The assembly according to claim 1, wherein said mount comprises a closed loop, wherein a threaded post of an arrowhead is extendable through said closed loop to hold said mount between the arrowhead and an arrow shaft.

3. The assembly according to claim 1, wherein said arm is frangible and breaks when kinetic energy between said mount and said casing is greater than a selected foot pounds.

4. A transmitter anchoring assembly being mountable on an arrow and being embeddable into an animal when the arrow strikes the animal to assist a person in tracking the animal, said assembly including:
    a mount being positionable on an arrow;
    a pair of arms being attached to and extending away from said mount in a same direction with respect to each other;
    a pair of casings, each of said arms having one of said casings attached thereto and being distal to said mount;
    a pair of hooks, each of said casings having one of said hooks attached thereto, said hooks each having a point being positioned behind said mount, each said point being directed forward toward said mount and being embeddable into the animal when the arrowhead goes into the animal to halt penetration of said casings when the arrowhead enters the animal and to break said arms; and
    a pair of transmitters, each of said casings having one of said transmitters mounted therein, said transmitters emitting a wireless signal detectable by a receiver to determine a direction of said transmitters by the receiver.

5. The assembly according to claim 4, wherein said mount comprises a closed loop, wherein a threaded post of an arrowhead is extendable through said closed loop to hold said mount between the arrowhead and an arrow shaft.

6. The assembly according to claim 4, wherein said arms are frangible and break when kinetic energy between said arms and said mount is greater than a selected foot pounds.

7. A transmitter anchoring assembly being mountable on an arrow and being embeddable into an animal when the arrow strikes the animal to assist a person in tracking the animal, said assembly including:
    a mount being positionable on an arrow, said mount comprising a closed loop, wherein a threaded post of an arrowhead is extendable through said closed loop to hold said mount between the arrowhead and an arrow shaft;
    a pair of arms being attached to and extending away from said mount in a same direction with respect to each other, said arms being spaced from each other;
    a pair of casings, each of said arms having one of said casings attached thereto and being distal to said mount, said arms being frangible and breaking when kinetic energy between said mount and said casings is greater than a selected foot pounds;
    a pair of hooks, each of said casings having one of said hooks attached thereto, said hooks each having a point being positioned behind said mount, each said point being directed forwards toward said mount and being embeddable into the animal when the arrowhead goes into the animal to halt penetration of said casings when the arrowhead enters the animal; and
    a pair of transmitters, each of said casings having one of said transmitters mounted therein, said transmitters emitting a wireless signal detectable by a receiver to determine a direction of said transmitters by the receiver.

\* \* \* \* \*